Figure 1:
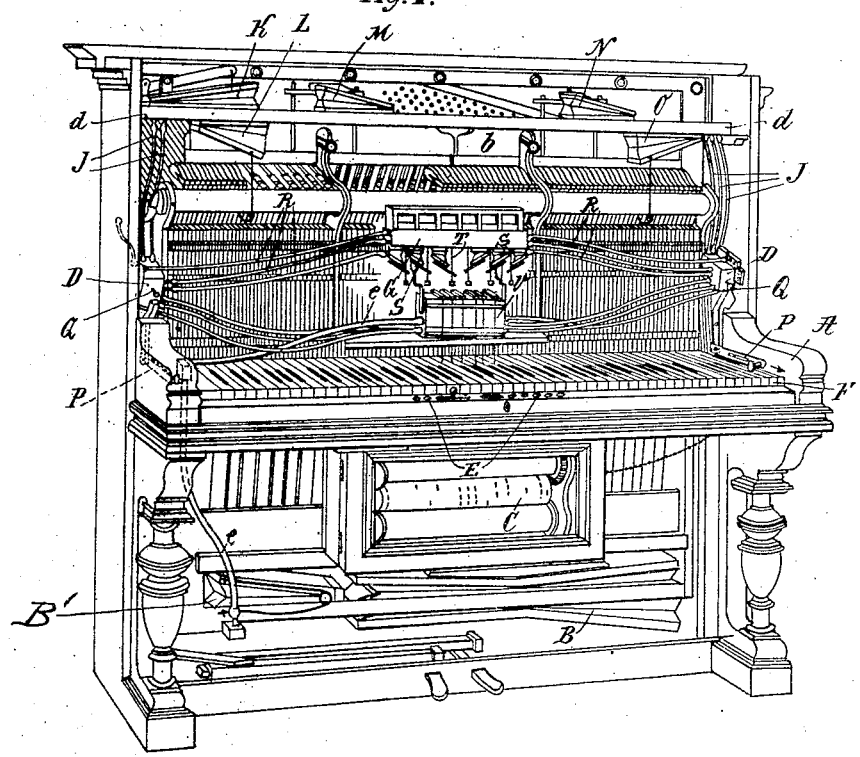

W. PAPE.
MECHANICALLY PLAYED KEYBOARD INSTRUMENT.
APPLICATION FILED AUG. 25, 1904.

919,295.

Patented Apr. 20, 1909.
4 SHEETS—SHEET 1.

Witnesses:

Inventor
Wilhelm Pape
By James W. Norris
Atty.

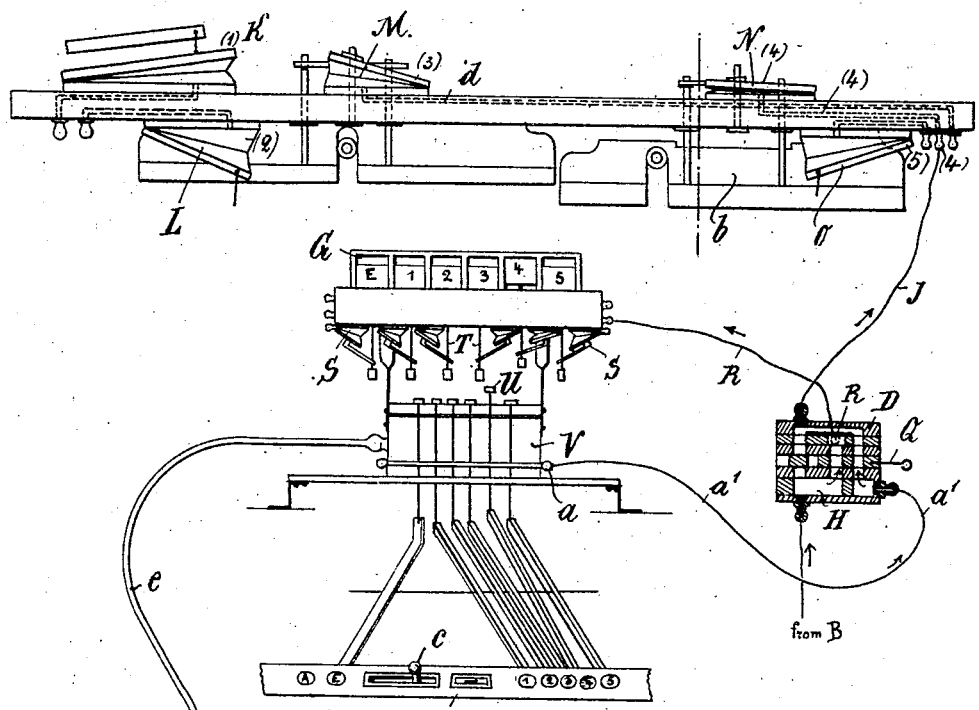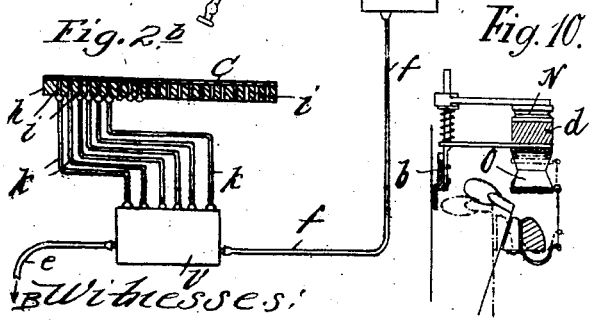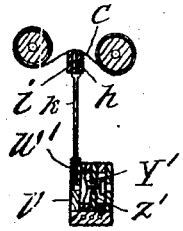

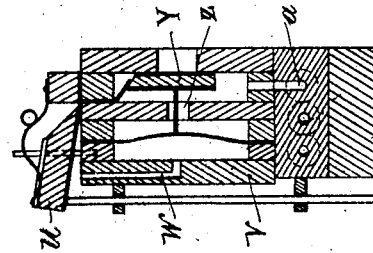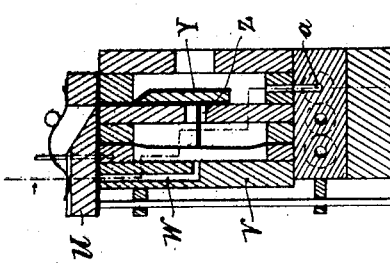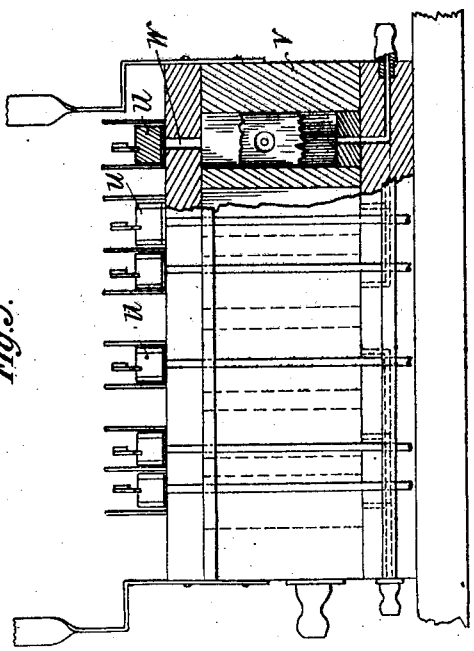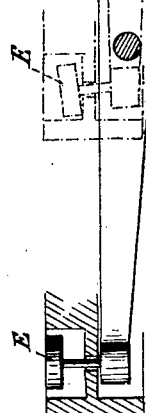

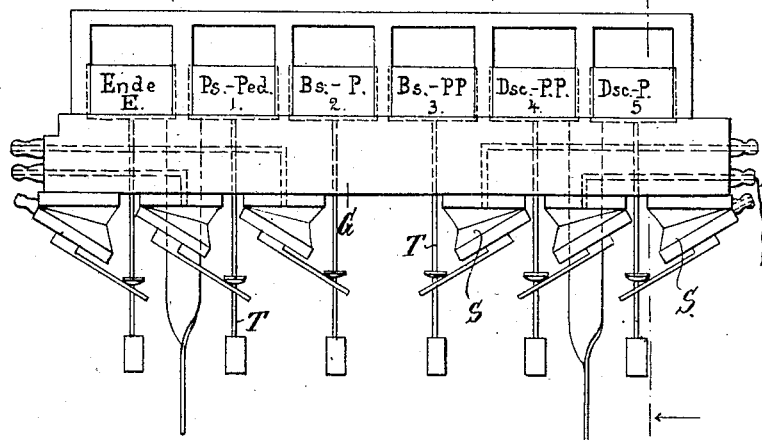
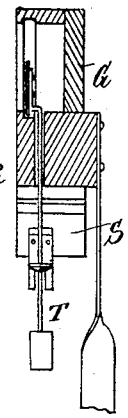
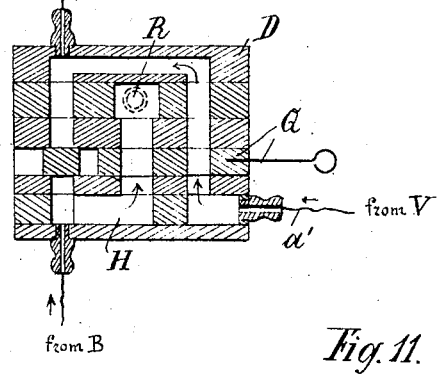
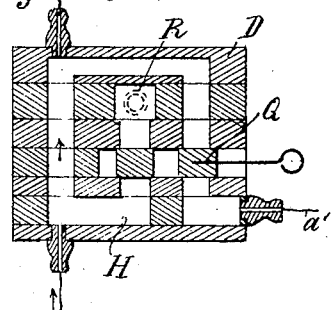
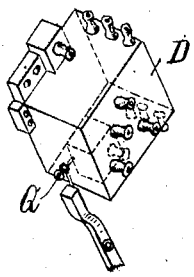

UNITED STATES PATENT OFFICE.

WILHELM PAPE, OF BERLIN, GERMANY, ASSIGNOR OF ONE-HALF TO K. HEILBRUNN SÖHNE, OF BERLIN, GERMANY.

MECHANICALLY-PLAYED KEYBOARD INSTRUMENT.

No. 919,295.　　　Specification of Letters Patent.　　　Patented April 20, 1909.

Application filed August 25, 1904. Serial No. 222,153.

*To all whom it may concern:*

Be it known that I, WILHELM PAPE, a subject of the Emperor of Germany, residing at Berlin, Germany, have invented certain new and useful Improvements Relating to Mechanically-Played Keyboard Instruments, of which the following is a specification.

This invention relates to pianofortes and other keyboard instruments which are played automatically by means of pneumatic apparatus arranged in the interior of the instrument itself, and my improved apparatus comprises a multiple-way slide-valve or switching device which permits the various dampers, pedals, and the like of the instrument either to be actuated automatically by mechanism controlled by the perforated or other band on which the notes are represented or to be actuated by mechanism controlled by hand, an indicating device actuated automatically by mechanism controlled by the said band being preferably provided to indicate to the player the proper damper, pedal or the like to be actuated at any particular time in the event of his not being skilled in music. By this means, perfect artistic playing can be obtained with a mechanically-played keyboard instrument.

The subject of the invention is shown in the accompanying drawings in its application to a piano-forte and in detail in these drawings—Figure 1 shows an open pianoforte having the subject of my invention applied thereto. Fig. 2 is a diagram illustrating the general arrangement of the subject of my invention. Fig. 2$^a$ is a detail view hereinafter more fully described. Fig. 2$^b$ is a detail view showing a vertical longitudinal section of Fig. 2$^a$. Fig. 3 is a front elevation partly in section of the valve casing. Figs. 4 and 5 are transverse sections of the said valve casing, showing the valves in different positions. Fig. 6 is a front elevation of the indicating device. Fig. 7 is a transverse section of the same. Figs. 8 and 9 show the controlling device with the slide valve in different positions. Fig. 10 is a cross section illustrating the connection of the regulating bellows with the device for altering the expression. Fig. 11 is a perspective view of the controlling device.

Like characters refer to like parts throughout the several figures.

In the drawings, the piano-forte, as A, is operated or played in the usual manner by any suitable motor which controls or, in other words, actuates a main suction bellows, as B, and an auxiliary suction bellows, as B'. A perforated sheet or band C, which may also be of common construction required for playing the piano-forte, further serves for moving the loud and soft pedals by means of corresponding perforations in the said band which control valves and operating bellows for the pedals.

My invention, as will be hereinafter explained in detail, involves a switching device, as D, which is introduced into and is in communication with the suction piping that effects the regulation or control of the pedals; and this switching device permits the pedals either to be moved directly by the perforations in the band C or by hand through an auxiliary keyboard E which is arranged in front of the main keyboard F of the piano-forte. The said auxiliary keyboard E is suitably connected with the switching device and with bellows K, L, M, N and O which act directly on the loud and soft pedals. For persons who are not musical, a device G is provided, which is actuated also through the medium of the perforated band C, operative with the switching device D and which indicates what key of the auxiliary keyboard is to be depressed.

The operation of controlling the pedals is as follows: A suction bellows B is actuated, as previously stated, by any suitable motor, and its operation is continuous during the playing of the piano. Said bellows B is connected by means of suitable piping or tubing $c'$ to an apparatus V' comprising a series of valves controlled by the perforated music band C, these valves being respectively connected by pipes $f, f$ to convolute channels H in the switching devices D, the latter being designed to make connection between the playing device and the soft and loud stops so that the latter are either controlled directly by the perforated sheet or band C or by hand, according to the position of the valves in the switching devices D, as will be hereinafter described.

The switching devices D, as stated, are provided with convolute channels H forming passages adapted for communication with the number of pedal bellows to be operated. In this instance there are employed two switching devices D, each provided in the casing thereof with three similar or corresponding convolute channels, as H. Communicating with the channels H are pipes or tubes J which extend to the bellows K, L, M, N, and O respectively. The valve Q connects the bellows B to the pedal pulleys K, either through the auto valve box V' or manual box V. If the instrument and also the pedals are to be actuated solely by the perforated band C, a handle P is moved in the direction indicated by the arrow in Fig. 1, so as to cause the slide Q to be moved inward, and in this manner the latter opens communication between the bellows B and the pipes or tubes J connected with the bellows K, L, M, N, and O. When the pedals are to be controlled by hand, the handle P is moved inward to cause the slide Q to be pulled outward, which will shut off communication from the bellows B to said bellows K, L, M, N, and O, and at the same time exhaustion of the bellows S of the indicating device takes place through the pipes R. The indicating device is arranged in the front of the instrument so that it can be easily seen. This indicator is preferably made of similar appearance to the room-indicators used in hotels and private homes in connection with electric or pneumatic bells. The perforated band, which is made in a well known manner, during its travel permits the exhaustion of one or the other of the bellows S connected to the indicating device, whereby a rod T is raised. A plurality of these rods T is provided in the indicating device, and each bears a tablet with a figure or other inscription corresponding to a key of the auxiliary keyboard E. When one of said rods T is raised it brings to view the proper tablet having an indicating mark thereon of any suitable character to designate to the operator that the key of the auxiliary keyboard which bears a similar or corresponding character is to be depressed. For example, see the key 4 and tablet 4 corresponding thereto.

If the slides Q are in the pushed-in position (Fig. 9) a direct path is open for the air to the bellows K, L, M, N, and O from the main bellows B, apparatus V', and pipes f through the switching device D, so that the loud and soft stops will be controlled by the perforated band C. If the slides Q are in their drawn-out position, as in Fig. 8, the air passing to the bellows B must pass through the pipes R to the switching device D from the indicating device G, where the bellows S is exhausted and the indicating tablet is thereby moved in position for observation. The operation of the loud and soft stops is effected now by hand, for which purpose the knob of which the number has appeared at the indicating device, is depressed. The indicating device G is continually kept at a vacuum by a suction pipe e. Thus, as soon as the knob is pressed, air at a reduced pressure passes through a, through the pipe a', into the corresponding convolute passage H of the switching device D, through the pipe J to the bellows connected therewith and by the collapsing of which the adjustment of the stop is effected. During the depression of the key 4, for example, in Fig. 2, a spring-controlled valve U in a valve casing V is opened, see Figs. 3 and 5. During the opening of the valve U, air enters through the passage W into the diaphragm chamber (which is normally kept under a reduced pressure) so that the diaphragm moves the valve Y from the position shown in Fig. 4 into the position shown in Fig. 5, and opens a passage Z. By this means air is drawn through the passage a which is connected through the pipe a' to the convolute passage of the switching device D and through pipe J from the corresponding one of the bellows K, L, M, N, and O, the collapsing of which latter causes the adjustment of the pedals. Assuming that the key 4 of the auxiliary keyboard shown in Fig. 2 is depressed and consequently the valve U of the casing V is open, the air enters into the passage W and the valve Y is moved in a position so that the piping R leading to the switching device is open, thus forming communication therewith. By movement of the slide Q, communication with the bellows 4, Fig. 2, is opened, and on exhaustion of the latter the damper or moderator b is moved, which forms the treble pianissimo. The perforated band C causes, through the pipe R, a tablet to be brought to view in the indicating device for designating to the operator that the key 4 of the auxiliary keyboard E is to be depressed. Exactly the same series of operations is gone through in actuating the remaining pedals.

In order that the playing may be effected with as much expression as possible, the pedal arrangements are divided into bass pedal, bass piano, and bass pianissimo, and also treble and treble pianissimo. This division is made in the middle so that each half can be actuated separately.

The instrument is set in motion by pressing on a key A of the auxiliary keyboard E. By pressing this key the motor (not shown) is started and the suction bellows and perforated band are set in operation. By pressing on the key E said motor is stopped. The time is controlled by actuating the lever c, which is likewise arranged in the auxiliary keyboard E. This lever is connected with the resistance or brake of the motor, and on being adjusted produces a slow or rapid running of said motion. It is obvious that it is possible to control the playing, both as regards time and expression. By depressing the various keys a large number of variations can be made in the playing, accordingly as the bass pedals are actuated simultaneously with the piano pedals.

The whole apparatus can be mounted in the piano-forte or like instrument without increasing the size thereof so that a special or separate playing apparatus is not required. The transmission of the motion from the pedal bellows, K, L, M, N, and O is effected by means of cords or rods.

The perforated band C is fed along in the ordinary way over a bar $h$ perforated with passages $i$ in such a manner that it normally closes the mouths of the passages, which are only freed when apertures in the perforated band move over them. From those passages $i$, which correspond to the pedals and indicators, flexible pipes $k$ extend to an apparatus V' which in its essentials is similar to the apparatus V in Figs. 3–5. The pipes $k$ are connected to the passages W' of the apparatus V' and the action is such that, in the moving of an aperture in the perforated band in front of the mouth of a passage $i$, the pressure of the outer atmosphere enters into the diaphragm-chamber (which is otherwise exhausted by reason of its connection with the suction-pipe $e'$), whereby the diaphragm moves to the right and the valve Y' frees the aperture Z', so that the connection of the particular pipe $f$ with the suction-pipe $e'$ is made. It should be noted that the apparatus V' only differs from the apparatus V in that the air-inlet is controlled through W' (W) by means of the perforated band, instead of by means of the valve U together with the linkwork pertaining thereto.

When the indicating device is dispensed with, the convolute channel of the switching device D can be connected directly with the valve casing B and the action of the bellows K, L, M, N, and O remains the same as described above. The several pipes J, which extend from the switching device D to the pedal bellows K, L, M, N, and O, lie side by side in the casing $d$ of the piano-forte. The indicating device can obviously be arranged in any position in the instrument so as to be conveniently seen by the player. The piano-forte can also be played by hand in the same manner as any mechanically played key-board instrument.

What I claim is:

1. The combination in a mechanically played keyboard instrument, of a main suction bellows, an auxiliary suction bellows, tone sustaining and soft pedals, a main keyboard, an auxiliary keyboard in front of the main keyboard, a switching device, pedal bellows which directly act on the latter, connections between the auxiliary keyboard and the switching device and pedal bellows, an indicating device connected to the switching device and operating in conjunction with the auxiliary keyboard to designate what key of the latter is to be depressed for directing unmusical persons, a valve apparatus connected to the main suction bellows and the switching device, a tracker-board, and a perforated music band controlling the operation of the valve apparatus.

2. The combination in a mechanically played keyboard instrument, of a main suction bellows, an auxiliary bellows, pedal bellows, multiple way switch means and controlling valves therefor having connections with the said bellows, a main keyboard, an auxiliary keyboard in front of the main keyboard and connected to the switch means, key-controlled valves, pneumatics for operating said valves, a connection between the auxiliary bellows and valves and between the latter and the multiple way switch means, means for manually controlling said multiple way switch means, pneumatic indicators connected to said switch means, and a traveling perforated band for controlling the main bellows air connections.

3. The combination with a mechanically played keyboard instrument, of devices for producing sustained and soft tone effects, bellows mechanism for operating said devices, a main actuating bellows, multiple way switching means connected to the bellows for operating the sustaining and soft tone effect devices and also with the main actuating bellows, a main keyboard, valves, pneumatics for operating said valves through the actuation of the keys of the main keyboard, pipes connecting the latter valves and the multiple way switching means, an auxiliary keyboard, pneumatic indicators connected to the auxiliary keyboard, pipes connecting said indicators with the switching means, and a traveling perforated band for controlling the main bellows air connections.

4. The combination with a mechanically played keyboard instrument, of devices for producing sustained and soft tone effects, mechanism for operating said devices, means for automatically controlling said operating mechanism, means for manually controlling said operating mechanism, means for independently throwing either the automatic or manual controlling means into action, a main keyboard, an auxiliary keyboard, and valve mechanism connected to the main and auxiliary keyboards, a part of the valve mechanism connected to the auxiliary keyboard being in the form of an indicator having separately operating enunciating members.

5. The combination in a mechanically played keyboard instrument, of devices for producing sustained and soft tone effects, pneumatic mechanism for operating said devices, main bellows for actuating said operating mechanism, manually operable pneumatically actuated valves for controlling said pneumatic operating mechanism, auxiliary bellows for actuating said manually controlled valves, multiple way switch means and controlling valves therein, pipe connections between the said multiple way switch means, manually controlled valves and main bellows, a main keyboard operatively associated with said mechanism, means and valves, an auxiliary keyboard, and a perforated traveling music sheet.

In testimony whereof I have hereunto set my hand in presence of two subscribing witnesses.

WILHELM PAPE.

Witnesses:
SIEGFRIED HERZBERG,
HENRY HASPER.